United States Patent
Brothers

(10) Patent No.: US 11,186,421 B2
(45) Date of Patent: Nov. 30, 2021

(54) STORAGE TANK DEVICE CONFIGURED TO PREVENT ICE FORMATION

(71) Applicant: Custom Biogenic Systems, Inc., Bruce Township, MI (US)

(72) Inventor: John G. Brothers, Bruce Township, MI (US)

(73) Assignee: CUSTOM BIOGENIC SYSTEMS, INC., Bruce Township, MI (US)

( * ) Notice: Subject to any disclaimer, the term of this patent is extended or adjusted under 35 U.S.C. 154(b) by 245 days.

(21) Appl. No.: 16/582,801

(22) Filed: Sep. 25, 2019

(65) Prior Publication Data

US 2021/0086978 A1    Mar. 25, 2021

(51) Int. Cl.
| | |
|---|---|
| *B65D 81/38* | (2006.01) |
| *F17C 13/04* | (2006.01) |
| *F17C 13/02* | (2006.01) |
| *B65D 77/04* | (2006.01) |
| *B65D 90/48* | (2006.01) |
| *F17C 13/00* | (2006.01) |

(52) U.S. Cl.
CPC ......... *B65D 81/3806* (2013.01); *B65D 77/04* (2013.01); *B65D 81/3825* (2013.01); *B65D 90/48* (2013.01); *F17C 13/006* (2013.01); *F17C 13/025* (2013.01); *F17C 13/04* (2013.01); *F17C 2250/043* (2013.01)

(58) Field of Classification Search
CPC ............ B65D 81/3806; B65D 81/3825; B65D 90/48; B65D 77/04; F17C 13/006; F17C 2250/043; F17C 2270/0509; F17C 2201/0119; F17C 2201/056; F17C 2201/032; F17C 2250/0417; F17C 2223/0161; F17C 2221/014; A01N 1/0257

USPC .......................................................... 62/45.1
See application file for complete search history.

(56) References Cited

U.S. PATENT DOCUMENTS

| | | | | |
|---|---|---|---|---|
| 3,938,347 A | * | 2/1976 | Riedel | F16C 13/02 62/49.2 |
| 4,918,927 A | * | 4/1990 | Eigenbrod | F17C 3/10 62/45.1 |

(Continued)

FOREIGN PATENT DOCUMENTS

| | | | | |
|---|---|---|---|---|
| GB | 2398115 A | * | 8/2004 | ............. F17C 13/02 |
| GB | 2398115 A | | 8/2004 | |

(Continued)

OTHER PUBLICATIONS

KR-101599243-B1 English Translation of Specification (Year: 2021).*

(Continued)

*Primary Examiner* — Timothy P. Kelly
*Assistant Examiner* — Stephanie A Shrieves
(74) *Attorney, Agent, or Firm* — Brown & Michaels, PC

(57) ABSTRACT

A cryogenic storage device includes a storage tank having an inner tank, an intermediate tank and an outer tank spaced apart from each other so as to define a fluid reservoir for holding a cryogenic liquid and a thermal insulative space bounding the fluid reservoir. A top cover closes the open top. An inlet supplies the cryogenic liquid to the fluid reservoir. A fluid sensor is configured to detect a pressure within the cryogenic storage device and is removably disposed within the fluid reservoir so as to allow an ice formation to be thawed without having to thaw the entire cryogenic storage device.

12 Claims, 6 Drawing Sheets

(56) References Cited

U.S. PATENT DOCUMENTS

| | | | | |
|---|---|---|---|---|
| 5,520,004 | A * | 5/1996 | Jones, III | A23L 3/36 |
| | | | | 62/266 |
| 6,016,697 | A * | 1/2000 | McCulloch | G01F 23/266 |
| | | | | 73/304 C |
| 6,393,847 | B1 * | 5/2002 | Brooks | F17C 13/006 |
| | | | | 62/48.1 |
| 8,434,211 | B2 * | 5/2013 | Dreyer | G01F 23/266 |
| | | | | 29/593 |
| 2004/0028569 | A1 | 2/2004 | Zorich et al. | |
| 2005/0056027 | A1 | 3/2005 | White | |
| 2006/0123902 | A1 | 6/2006 | Pechtold et al. | |
| 2014/0352329 | A1 * | 12/2014 | Bloedow | F25B 21/02 |
| | | | | 62/3.6 |
| 2016/0084577 | A1 * | 3/2016 | Chou | F25B 49/046 |
| | | | | 62/271 |
| 2016/0349097 | A1 * | 12/2016 | Crouse | G06Q 10/087 |

FOREIGN PATENT DOCUMENTS

| | | | |
|---|---|---|---|
| KR | 20020004524 A | | 1/2002 |
| KR | 101599243 B1 * | | 3/2016 |
| KR | 101599243 B1 | | 3/2016 |

OTHER PUBLICATIONS

International Search Report for PCT/US2020/052915 dated Dec. 17, 2020.

* cited by examiner

STORAGE TANK DEVICE CONFIGURED TO PREVENT ICE FORMATION

TECHNICAL FIELD

This disclosure relates to a cryogenic storage tank.

BACKGROUND

Cryogenic storage tanks are used to store items under sub-arctic temperature. For instance, cryogenic storage tanks may be configured to store items at temperatures of −196° Fahrenheit. The cryogenic storage tank may include a fluid sensor configured to detect the pressure within the tank so as to ensure that sufficient cryogenic fluid is present.

FIG. 1 shows a current embodiment of a cryogenic storage device 100 wherein the fluid sensor 102 is disposed in a vacuumed inner space of a storage tank 104. The fluid sensor 102 is a tube fixedly coupled to a sensing unit 106 configured to detect the pressure within the vacuumed inner space, such a sensing unit is currently known and used and is illustratively shown as a vacuum tube. The temperature decreases with respect to a height of the cryogenic storage tank which may cause ice formation within the tube of fluid sensor 102 which causes the sensor to detect an incorrect pressure.

Removing the ice requires the serviceman to allow the storage tank 104 to warm to above the melting point of the ice, as application of a direct heat does not remove the ice as the ice instantly freezes. Accordingly, the items within the storage tank must be removed to another cryogenic storage device during the thawing process.

Accordingly, it remains desirable to have cryogenic storage tank configured to detect a pressure of the tank and is configured to remove an ice formation without warming the entire cryogenic tank.

SUMMARY

The details of one or more implementations of the disclosure are set forth in the accompanying drawings and the description below. Other aspects, features, and advantages will be apparent from the description and drawings, and from the claims.

A cryogenic storage device for storing items in cryogenic environment is provided. The cryogenic storage device includes a storage tank. The storage tank includes an inner tank, and an outer tank. The inner tank is configured to hold a cryogenic liquid. The inner tank is spaced apart from the outer tank so as to form a thermal insulative space.

A fluid inlet is mounted to the storage tank so as to be supply cryogenic liquid into a fluid reservoir of the inner tank. The cryogenic liquid is thermally insulated by the thermal insulative space. A fluid sensor is configured to detect a pressure within the cryogenic storage device. The fluid sensor is removably disposed within the inner tank so as to allow an ice formation to be thawed without having to thaw the entire cryogenic storage device.

In one aspect, the fluid sensor is a capacitance sensor. In another aspect, the collar assembly includes an upper collar mounted to the outer tank and a lower collar mounted to the inner tank. The collar assembly is sealed to the inner tank and outer tank so as to maintain the integrity of the thermal insulative space, the fluid sensor removable coupled to the upper collar.

In one aspect of a collar assembly, the upper collar and the lower collar each have a slot extending along a radius of the respective upper and lower collar. An intermediate tube is seated within the slot of the respective upper and lower collar.

In one aspect, the fluid sensor includes a head, and the head is fixedly attached to the fluid sensor and removably attached to the collar assembly. For instance, the head may be configured to have a bore dimensioned to receive the upper collar.

In one aspect of the cryogenic storage device, the head includes a vacuum port, the vacuum port is open to the thermal insulative space. In such an aspect, the cryogenic storage device may further include an air compressor.

In one aspect, the cryogenic storage device further includes a control housing. The control housing houses a control unit. The control unit is configured to process the fluid level detected by the fluid sensor within the inner tank so as to determine an amount of cryogenic liquid within the inner tank.

Other aspects of the cryogenic storage device are also contemplated herein, illustratively including a carousel rotatably mounted within the inner tank; a valve assembly for controlling the supply of cryogenic liquid into the inner tank; and/or a manual inlet fluidly coupled to the inner tank via the fluid inlet.

Accordingly, the cryogenic storage device is provided which helps keep the cryogenic storage device in operation by allowing ice formation occurring in the fluid sensor to be thawed by removal of the fluid sensor, rather than by allowing the entire cryogenic storage device to thaw as is the method currently used.

DESCRIPTION OF DRAWINGS

Like reference symbols in the various drawings indicate like elements.

DETAILED DESCRIPTION OF PREFERRED EMBODIMENTS

A cryogenic storage device is provided that eliminates the need to thaw the entire device to remove ice formation in a fluid sensor. The cryogenic storage device includes a storage tank having an inner tank and an outer tank spaced apart from each other so as to define a thermal insulative space bounding the inner tank. A fluid inlet supplies the cryogenic liquid to the inner tank. A fluid sensor is configured to detect a fluid level within the inner tank. The fluid sensor is removably disposed from the storage tank so as to allow an ice formation to be thawed without having to thaw the entire cryogenic storage device.

Figure 1:
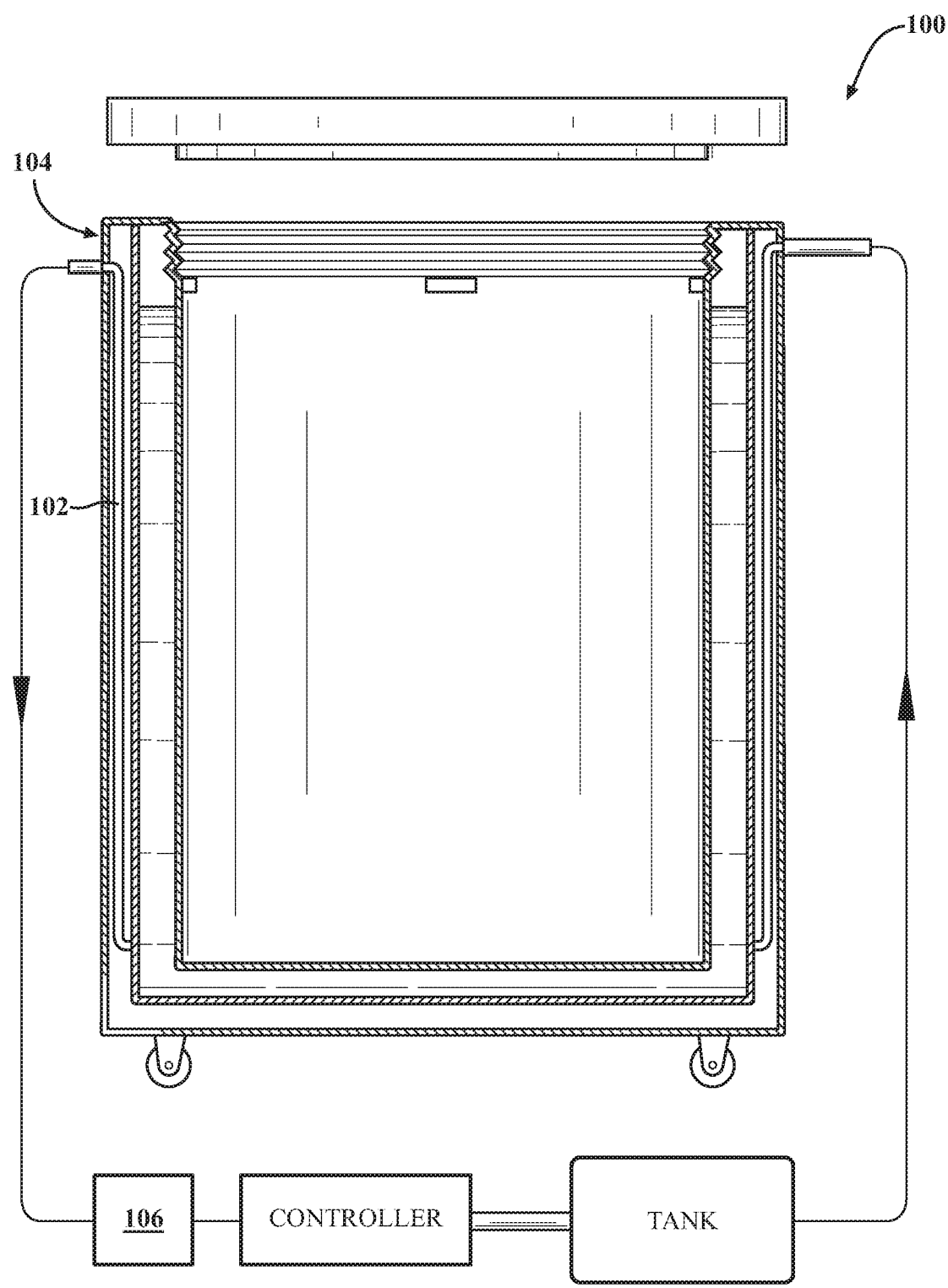
FIG. 1 is a depiction of a prior art cryogenic storage tank.
Figure 2:
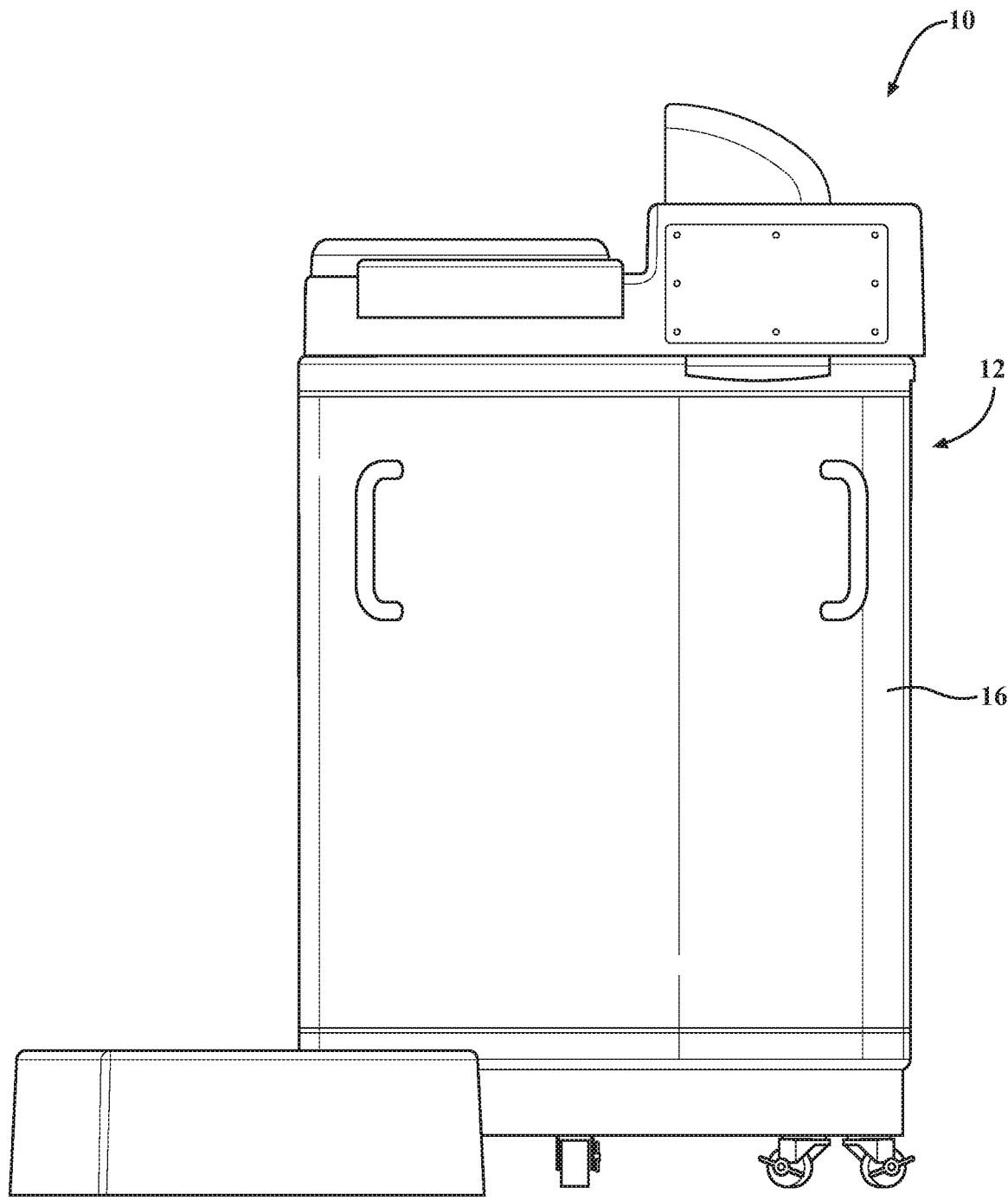
FIG. 2 is a perspective view of a cryogenic storage tank according to one or more embodiments described herein.

With reference first to FIG. 2, a cryogenic storage device 10 according to one or more embodiments described herein is provided. The cryogenic storage device 10 is configured to store items, such as biologic specimens in a cryogenic environment. The cryogenic storage device 10 includes a storage tank 12. The storage tank 12 is a generally cylindrical body wherein the top and bottom is closed. The cryogenic storage device 10 may include wheels and handles. The handles are illustratively shown fixed to an outer surface of the storage tank 12 so as to facilitate the movement of the cryogenic storage device 10.

For illustrative purposes, the storage tank 12 configured to hold 230 Liters and is preferably made of a rigid and durable material configured with withstand internal pressures of greater than 200 psi, such material is currently known and used and illustratively includes stainless steel. It should be appreciated that the dimension and pressure capabilities of the storage tank 12 may deviate from the example shown in the figures and described herein without deviating from the scope of the appended claims.

Figure 3:
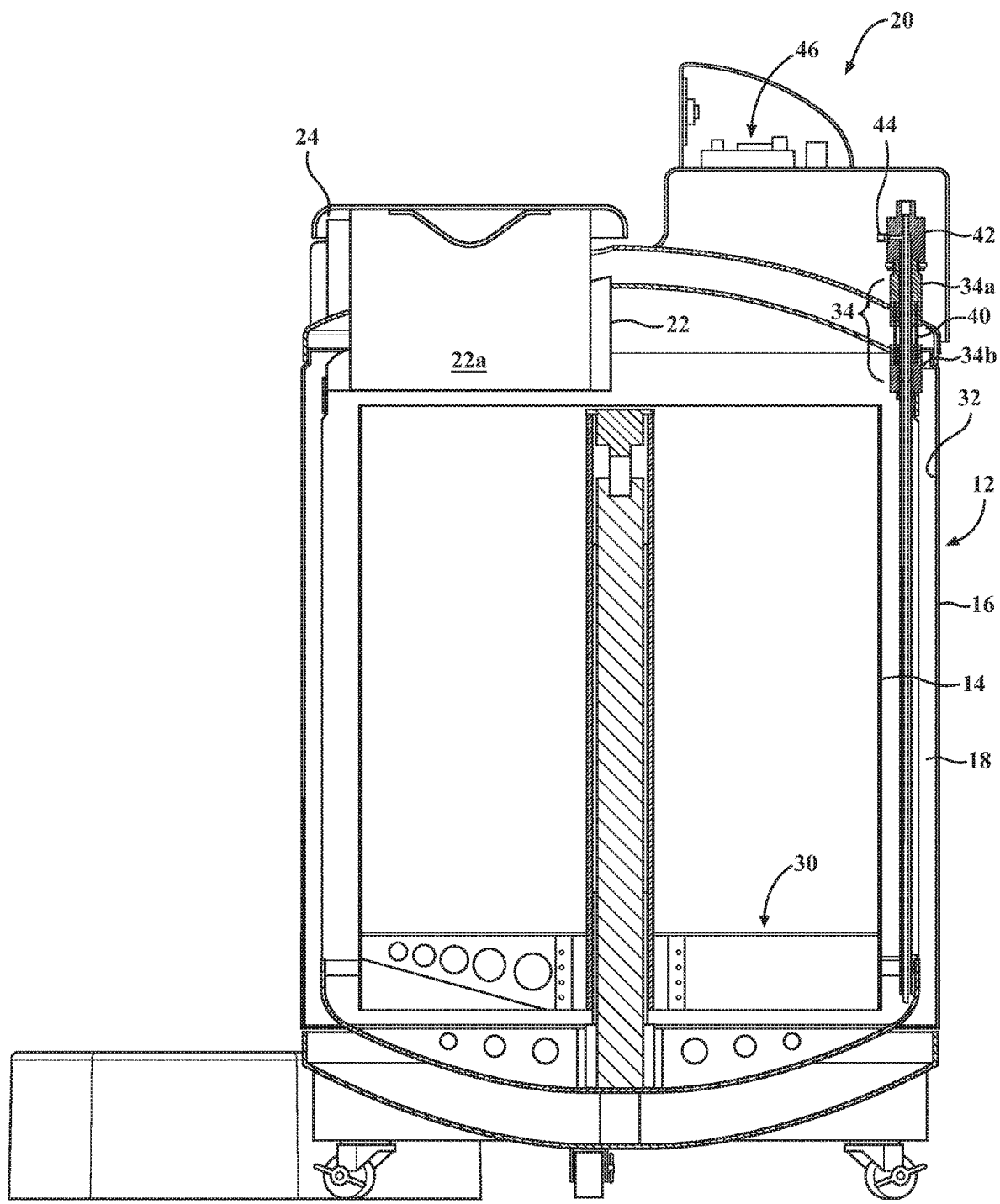
FIG. 3 is a cross-sectional view of FIG. 2 taken along line 3-3.

With reference again to FIG. 2 and also to FIG. 3, the storage tank 12 includes an inner tank 14 and an outer tank 16. Preferably the inner and outer tanks 14, 16 are made of a durable material suitable for use in a cryogenic environment, such as stainless steel. The inner tank 14 is configured to hold a cryogenic liquid and items such as biological specimens. The inner tank 14 is spaced apart from the outer tank 16 so as to form a thermal insulative space 18. The thermal insulative space 18 extends along the peripheral of the inner tank 14, bounding the inner tank 14. Preferably, the thermal insulative space 18 is vacuumed.

Figure 4:
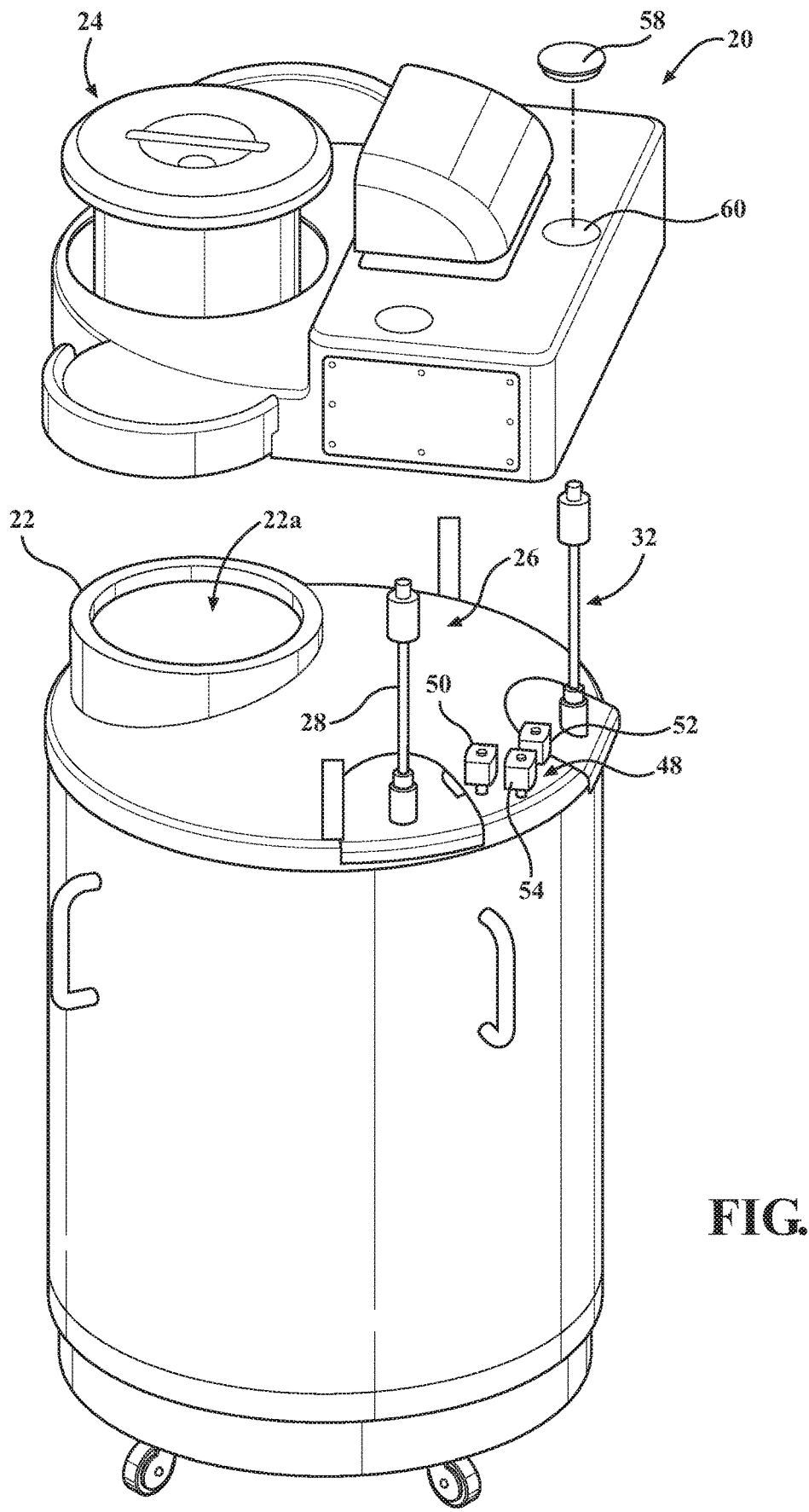
FIG. 4 is a perspective view showing the storage space of the cryogenic storage tank.

With reference again to FIG. 3 and also to FIG. 4, the cryogenic storage device 10 may further include a control housing 20. The top of the respective inner tank 14 and outer tank 16 is generally rounded and the control housing 20 is mounted to a top surface of the outer tank 16. Preferably, the control housing 20 is welded to the top of the storage tank 12.

FIG. 4 is an exploded view showing the top of the storage tank 12 and the control housing 20 above the storage tank 12. A neck 22 is formed on the storage tank 12. The neck 22 includes an opening 22a passing through the outer tank 16 and the inner tank 14 so as to provide access to the inner tank 14. The neck 22 may be formed of a composite material having thermal insulative properties, such as fiberglass. The neck 22 may include a lid 24 for opening and closing the access. The lid 24 is disposed within an opening of the control housing 20 and may be locked to the neck 22.

A fluid inlet 26 is mounted to the storage tank 12 so as to supply cryogenic liquid into the inner tank 14. In particular, the fluid inlet 26 extends through the outer tank 16 and the inner tank 14. A supply tube 28 is fluidly coupled to the fluid inlet 26 so as to supply cryogenic liquid into the inner tank 14. The supply tube 28 extends towards a bottom of the inner tank 14. Preferably, the supply tube 28 is formed of rigid and durable material configured to operate in a cryogenic environment such as stainless steel.

The cryogenic storage device 10 may further include a carousel 30 (shown in FIG. 3) is disposed within the inner tank 14. The carousel 30 may be rotatably disposed in the inner tank 14. The carousel 30 is preferably formed of stainless steel, and may include a plurality of trays spaced apart from each other, with each of the plurality of trays being rotated independent of each other. The carousel 30 holds items within the inner tank 14 above the cryogenic liquid which is deposited at the bottom of the inner tank 14 so as to prevent the items from being damaged. In one aspect of the carousel 30, the plurality of trays are stacked on top of each other and are configured to rotate independent of each other and may include openings so as to allow the user to access the different trays.

With reference again to FIG. 3 and now to FIG. 4, the cryogenic storage device 10 further includes a fluid sensor 32. The fluid sensor 32 is configured to detect a pressure within the cryogenic storage device 10. The fluid sensor 32 is removably disposed within the inner tank 14 so as to allow an ice formation to be thawed without having to thaw the entire cryogenic storage device 10.

Figures 5A, 5B:
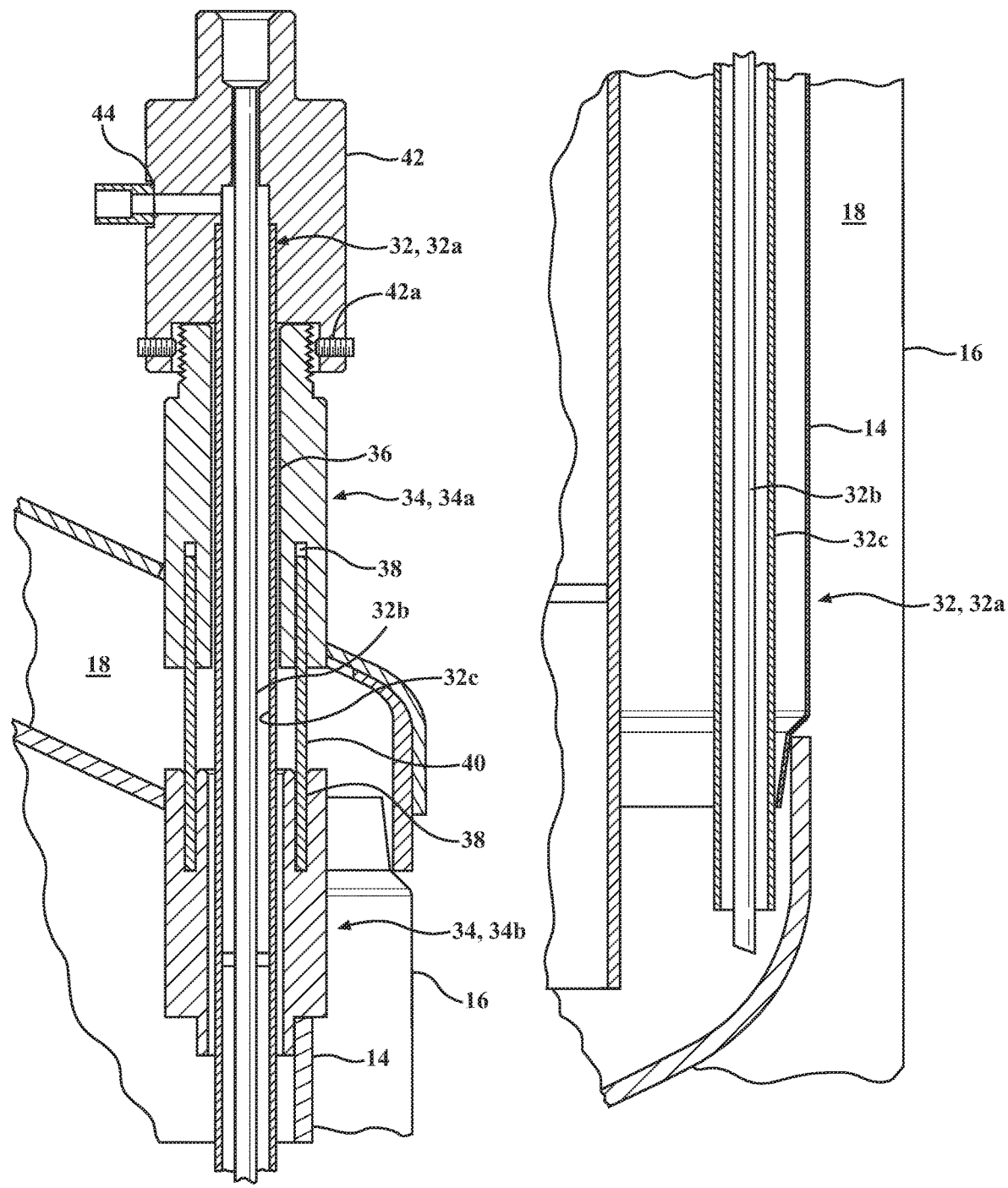
FIG. 5A is an isolated view of a top portion of the cryogenic storage tank shown in FIG. 3.
FIG. 5B is an isolated view of a bottom portion of the cryogenic storage tank shown in FIG. 3.

With reference now to FIG. 5A, one aspect of the cryogenic storage device 10 is provided wherein the cryogenic storage device 10 includes a collar 34 mounted to the outer tank 16 and the inner tank 14. The collar 34 includes a bore 36 in which the fluid sensor 32 is seated. The collar 34 is fitted to the outer tank 16 and the inner tank 14 so as to maintain the vacuum within the insulative space.

With reference again to FIG. 5A and also to FIG. 5B, a description of one aspect of the fluid sensor 32 and the collar 34 is provided. In one aspect, the fluid sensor 32 is a capacitance sensor 32a. The capacitance sensor 32a includes an inner rod 32b disposed within an outer sleeve 32c. The outer sleeve 32c has an open bottom so as to allow cryogenic liquid to rise therein. The inner rod 32b is centered within the outer sleeve 32c so as to be spaced apart from the inner surface of the outer sleeve 32c and fixed in position so as to define a uniform gap between the outer surface of the inner rod 32b and the inner surface of the outer sleeve 32c. The fluid sensor 32 is configured to detect a change in an electric resistance to calculate a fluid level of the inner tank 14.

In another aspect, the collar 34 includes an upper collar 34a mounted to the outer tank 16 and a lower collar 34b mounted to the inner tank 14. The collar 34 is sealed to the inner tank 14 and outer tank 16 so as to maintain the integrity of the thermal insulative space 18, the fluid sensor 32 removable coupled to the upper collar 34.

In one aspect of a collar 34, the upper collar 34 and the lower collar 34 each have a slot 38 extending along a radius of the respective upper and lower collars 34a, 34b. An intermediate tube 40 is seated within the slot 38 of the respective upper and lower collars 34a, 34b. In one aspect, the intermediate tube 40 is made of a glass reinforced epoxy configured to retain its shape under a vacuum pressure such as G10 tubing. It should be appreciated that the width the intermediate tube 40 is wider than a width of the slot 38 so as to form a pinch fit engagement between the intermediate tube 40 and the upper and lower collars 34a, 34b so as to retain the vacuum pressure of the insulative space 18.

In one aspect, the fluid sensor 32 includes a head 42. The head 42 is fixedly attached to the fluid sensor 32 and removably attached to the collar 34. For instance, the head 42 may be configured to have a bore 42a dimensioned to receive the upper collar 34a. A mechanical fastener such as a set screw may be screwed into a threaded opening of the upper collar 34a so as to fix and release the head 42 from the upper collar 34a.

In one aspect of the cryogenic storage device 10, the head 42 includes a vacuum port 44. The vacuum port 44 is open to the thermal insulative space 18, for example a bore may be formed in the head 42 and a corresponding bore may be formed in the upper collar 34a. The bore of the upper collar 34a is open to the thermal insulative space 18. The vacuum port 44 is fluidly coupled to the head 42 so as to be configured to draw air from the thermal insulative space 18 [please confirm this is correct]. In such an aspect, the cryogenic storage device 10 may further include an air compressor (not shown) configured to draw air through the vacuum port 44.

With reference again to FIGS. 2-4, the control housing 20 houses a control unit 46. The control unit 46 is configured to execute instructions for performing fluid level and pressure control functions. For example, the control unit 46 may include computing resources (e.g., data processing hardware, field programmable gate array ("FPGA") and the like) for executing instructions configured to determine fluid level based upon information detected by the fluid sensor 32 so as to determine an amount of cryogenic liquid within the inner tank 14 and/or actuate the air compressor so as to maintain a vacuum in the thermal insulative space 18.

The cryogenic storage device 10 may further include a valve assembly 48 for controlling the supply of cryogenic liquid into the inner tank 14. The valve assembly 48 may further include a vent 50 for releasing pressure within the storage tank 12.

Figure 6:
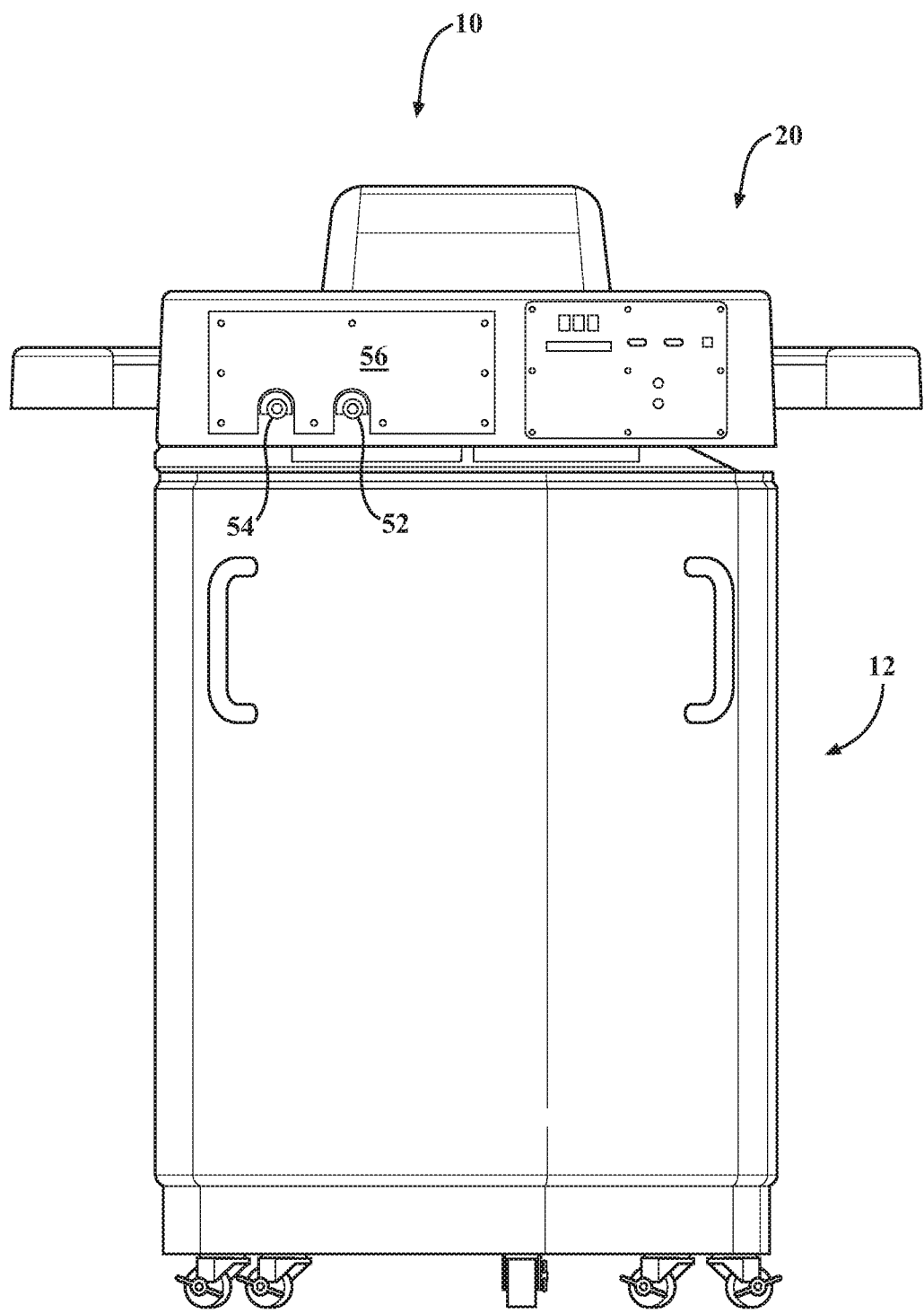
FIG. 6 is a view of FIG. 2 taken from the back.

The cryogenic storage device 10 may further include a manual inlet 52 fluidly coupled to the inner tank 14 via the fluid inlet 26. FIG. 6 provides an example of a cryogenic storage device 10 having an automatic inlet 54 and a manual inlet 52. The automatic inlet 54 is fluidly coupled to the valve assembly 48 and the manual inlet 52 wherein the storage tank 12 is coupled to a source of cryogenic liquid. Pressure within the storage tank 12 is processed by the valve assembly 48 to introduce cryogenic liquid from the source. As such, cryogenic liquid may be introduced automatically or manually via the automatic inlet 54 or the manual inlet 52.

In operation, the cryogenic liquid is introduced into the inner tank 14. Thus, the storage tank 12 is cooled to a sub-arctic temperature. The fluid sensor 32 is disposed within the inner tank 14 and is also subject to sub-arctic temperatures, as such, ice may form in the inner tube which may cause a false reading. In particular, the ice formation may cause the fluid sensor 32 to determine a high pressure when the pressure within the inner tank 14 is below a predetermined pressure. The control unit 46 sends the high pressure reading to the user and thus a service call is made.

The service provider may simply remove the fluid sensor 32 so as to allow the ice to thaw. For instance, the service provide simply removes a panel 56 from the control housing 20 to access the head 42 of the fluid sensor 32 and remove the mechanical fastener (set screw). A plug 58 is disposed on the top surface of the control housing 20 and closes an opening 60. The plug 58 is removed from the opening 60 and the fluid sensor 32 is simply removed through the opening 60. The fluid sensor 32 is then thawed to room temperature wherein the ice formation is eliminated. The fluid sensor 32 is then inserted through the opening and the head 42 is then fixed to the collar 34 by the mechanical fastener, and the panel 56 and plug 58 are installed. It should be appreciated that the cryogenic storage device 10 may operate during the service. It is also noted that the collar 34 maintains the vacuum of the thermal insulative space 18 during this operation.

Accordingly, the cryogenic storage device 10 is provided which helps keep the cryogenic storage device 10 in operation by allowing ice formation occurring in the fluid sensor 32 to be thawed by removal of the fluid sensor 32, rather than by allowing the entire cryogenic storage device 10 to thaw as is currently done.

A number of implementations have been described. Nevertheless, it will be understood that various modifications may be made without departing from the spirit and scope of the disclosure. Accordingly, other implementations are within the scope of the following claims.

What is claimed is:

1. A cryogenic storage device for storing items in a cryogenic environment, the cryogenic storage device having a storage tank, the storage tank including an inner tank and an outer tank, the inner tank configured to hold a cryogenic liquid, the inner tank disposed within the outer tank and spaced apart from an inner surface of the outer tank to define a thermal insulative space, the cryogenic storage device comprising:
    a fluid inlet configured to supply the cryogenic liquid into a fluid reservoir of the inner tank;
    a fluid sensor configured to detect a fluid level within the inner tank, the fluid sensor removably disposed within the inner tank to allow an ice formation to be thawed without having to thaw the entire cryogenic storage device; and
    a collar assembly having an upper collar mounted to the outer tank and a lower collar mounted to the inner tank, the collar assembly sealed to the inner tank and outer tank to maintain the integrity of the thermal insulative space, the fluid sensor removably coupled to the upper collar, the lower collar and the upper collar each having a cylindrical body including a through hole extending an axial length of the cylindrical body, the upper collar and the lower collar each have a slot extending along a radius of the respective upper and lower collar, the collar assembly further including an intermediate tube seated within the slot of the respective upper and lower collar.

2. The cryogenic storage device as set forth in claim 1, wherein the fluid sensor is a capacitance sensor.

3. The cryogenic storage device as set forth in claim 1, wherein the fluid sensor includes a head removably attached to the collar assembly.

4. The cryogenic storage device as set forth in claim 3, wherein the head includes a vacuum port open to the thermal insulative space.

5. The cryogenic storage device as set forth in claim 1, further including a control housing for housing a control unit, the control unit configured to process a pressure sensor within the inner tank to determine an amount of cryogenic liquid within the inner tank.

6. The cryogenic storage device as set forth in claim 1, further including a carousel rotatably mounted within the inner tank.

7. The cryogenic storage device as set forth in claim 1, further including a valve assembly, a control inlet, and a manual inlet, the control inlet fluidly coupled to the valve assembly, the valve assembly fluidly coupled to the fluid inlet, the manual inlet fluidly coupled to the fluid inlet.

8. A cryogenic storage device for storing items in cryogenic environment, the cryogenic storage device having an inner tank and an outer tank, the inner tank disposed within the outer tank and spaced apart from an inner surface of the outer tank to define a thermal insulative space, the cryogenic storage device comprising:
    a fluid inlet configured to supply the cryogenic liquid into the fluid reservoir;
    a capacitance sensor configured to detect a pressure within the cryogenic storage device, the capacitance sensor having a tubular member open to the thermal space, the capacitance sensor removably disposed within the thermal insulative space to allow an ice formation to be thawed without having to thaw the entire cryogenic storage device; and
    a collar assembly having an upper collar mounted to the outer tank and a lower collar mounted to the inner tank, the collar assembly sealed to the inner tank and the outer tank to maintain the integrity of the thermal space, the capacitance sensor removably coupled to the upper collar, the lower collar and the upper collar each have a cylindrical body having a through hole extending an axial length of the cylindrical body, the upper collar and the lower collar each having a slot extending along a radius of the respective upper collar and lower collar, the collar assembly further including an intermediate tube seated within the slot of the respective upper collar and lower collar.

9. The cryogenic storage device as set forth in claim 8, wherein the capacitance sensor includes a head removably attached to the collar assembly.

10. The cryogenic storage device as set forth in claim 9, wherein the head includes a vacuum port open to the thermal space.

11. A cryogenic storage device for storing items in a cryogenic environment, the cryogenic storage device having a storage tank, the storage tank including an inner tank and an outer tank, the inner tank configured to hold a cryogenic liquid, the inner tank disposed within the outer tank and spaced apart from an inner surface of the outer tank to define a thermal insulative space, the cryogenic storage device comprising:
 a fluid inlet configured to supply the cryogenic liquid into a fluid reservoir of the inner tank;
 a fluid sensor configured to detect a fluid level within the inner tank, the fluid sensor removably disposed within the inner tank to allow an ice formation to be thawed without having to thaw the entire cryogenic storage device; and
 a collar assembly having an upper collar mounted to the outer tank and a lower collar mounted to the inner tank, the collar assembly sealed to the inner tank and the outer tank to maintain the integrity of the thermal insulative space, the fluid sensor removably coupled to the upper collar, the fluid sensor including a head removably attached to the collar assembly, the head including a vacuum port open to the thermal insulative space.

12. A cryogenic storage device for storing items in a cryogenic environment, the cryogenic storage device having an inner tank and an outer tank, the inner tank disposed within the outer tank and spaced apart from an inner surface of the outer tank to define a thermal insulative space, the cryogenic storage device comprising:
 a fluid inlet configured to supply the cryogenic liquid into the fluid reservoir;
 a capacitance sensor configured to detect a pressure within the cryogenic storage device, the capacitance sensor having a tubular member open to the thermal space, the capacitance sensor removably disposed within the thermal insulative space to allow an ice formation to be thawed without having to thaw the entire cryogenic storage device; and
 a collar assembly having an upper collar mounted to the outer tank and a lower collar mounted to the inner tank, the collar assembly sealed to the inner tank and the outer tank to maintain the integrity of the thermal space, the capacitance sensor removably coupled to the upper collar, the lower collar and the upper collar each having a cylindrical body including a through hole extending an axial length of the cylindrical body, the capacitance sensor including a head removably attached to the collar assembly, the head including a vacuum port open to the thermal space.

* * * * *